Figure 8:
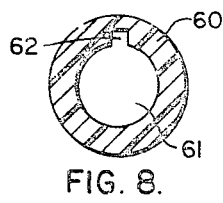

United States Patent

Harris, Sr. et al.

[15] 3,641,823
[45] Feb. 15, 1972

[54] INJECTION DEVICE

[72] Inventors: Rano J. Harris, Sr., 1945 Carolyn Sue Drive, Baton Rouge, La. 70815; Rano J. Harris, Jr., 9880 South Riveroaks, Baton Rouge, La. 71104

[22] Filed: Apr. 10, 1970

[21] Appl. No.: 27,207

[52] U.S. Cl. ............................................. 73/425.4
[51] Int. Cl. ............................................. G01n 1/10
[58] Field of Search ................ 73/425.4 R, 425.4 P, 425.6, 73/422 GC, 23.1; 222/148, 356

[56] References Cited

UNITED STATES PATENTS

| 2,263,845 | 11/1941 | Hartsell | 222/148 |
| 3,474,673 | 10/1969 | Harris | 73/422 |
| 2,704,171 | 3/1955 | Cole | 222/148 |

Primary Examiner—S. Clement Swisher
Attorney—Llewellyn A. Proctor

[57] ABSTRACT

In combination, liquid injection apparatus comprising a tubular plastic member, e.g., Teflon, through the internal tubular opening of which the forward end of a reciprocable plunger, adapted for receipt of a specimen, can be extended into contact with, and for receipt of, a liquid to be sampled. Upon withdrawal of the forward end of the plunger through the tubular opening, with which the plunger surface is in wiping contact, a measured quantity of the liquid specimen is transmitted therethrough for storage or for injection, while unmeasured liquid is wiped off of, and removed from, the surface of the plunger. In preferred embodiments, the forward end of the reciprocable plunger itself is recessed or provided with an internal capillary opening of measured capacity for containing the measured liquid specimen, and in another a longitudinal slot, or slots, located within the internal opening of the tubular plastic member leaves an accurately measured, or measurable, streak of liquid on the surface of the plunger for storage or injection.

10 Claims, 12 Drawing Figures

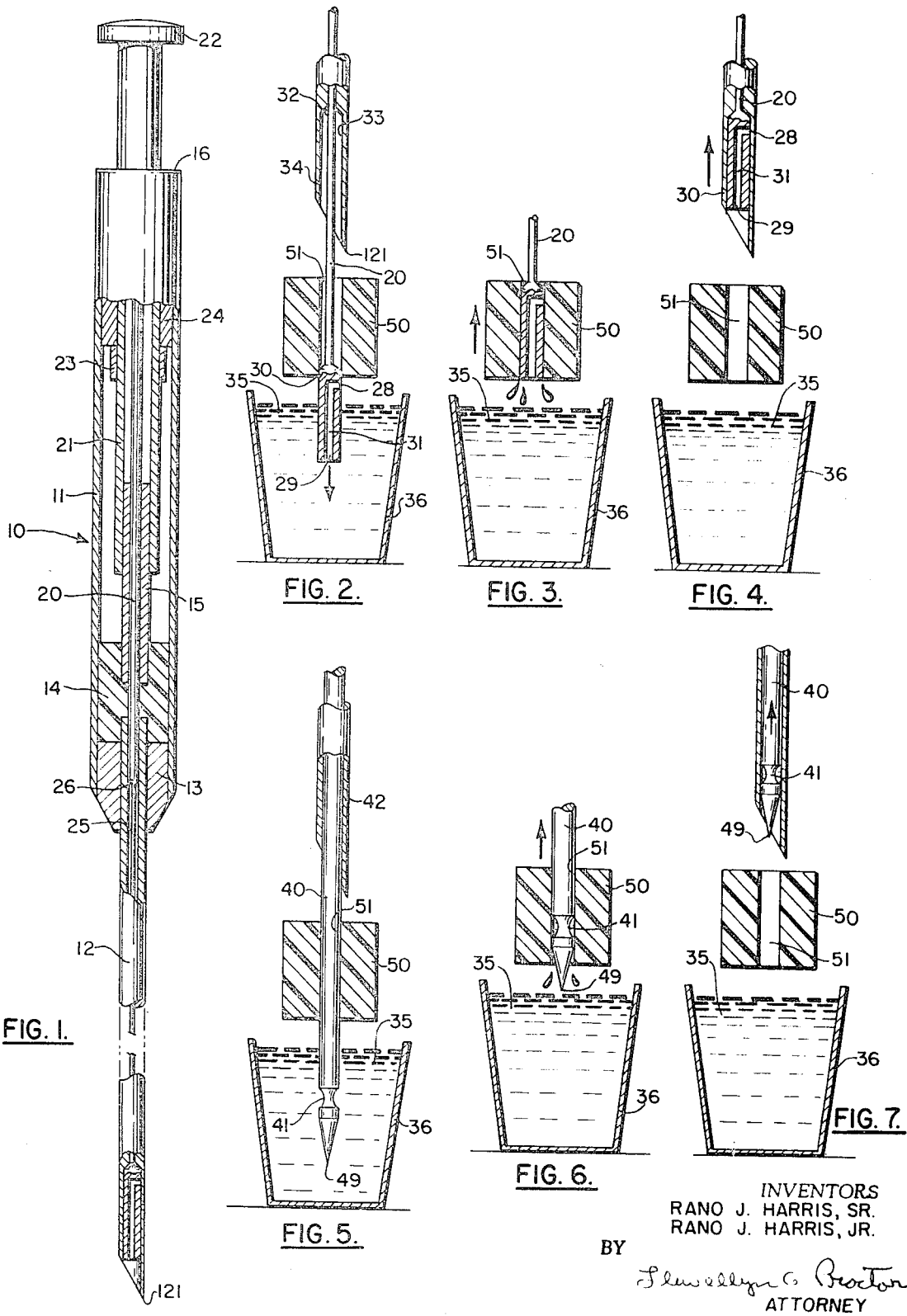

PATENTED FEB 15 1972

3,641,823

SHEET 2 OF 2

INVENTOR.
RANO J. HARRIS, SR.
RANO J. HARRIS, JR.
BY Llewellyn A. Proctor
ATTORNEY

INJECTION DEVICE

It is often necessary in modern analytical instrumentation procedures, e.g., in the art of gas chromatography, to directly inject infinitesmally small fluid specimens with high accuracy and precision. Thus, e.g., quantities of liquid as small as $10^{-2}$ to $10^{-6}$ milliliters must often be injected into the carrier gas that transports the specimen through the chromatographic column within which resolution into the various components is obtained. Obviously, when handling such small volumes of liquid, extremely small losses as may result from the inaccuracy or lack of precision in the specimen injection device can create undesirable, and even intolerably large, errors in analytical measurements.

Direct injection devices of such type, while representing a relatively new technology, are known to the art. Such a device was thus described in application Ser. No. 528,201, filed Feb. 17, 1966 (now U.S. Pat. No. 3,474,674) hereby incorporated by way of reference. The improved injection device therein described is thus characterized by the presence of a movable plunger slidably mounted within the bore of a tubular member, and tubular needle located at the forward end of said tubular member. The plunger per se is provided with a double-end forward capillary bore, and an end thereof is extended from an orifice at the forward face of the plunger to an orifice in the side of the plunger. In some embodiments the forward portion of the plunger is enlarged, the enlarged end containing the capillary opening. In all embodiment, the internal diameter of the forward portion of the needle is stepped up or enlarged to provide a housing for storage of the capillary containing forward portion of the plunger. Pursuant to such feature, the capillary-containing forward portion of the plunger can be extended outside the forward end of the needle, as for filling, or retracted into the enlarged needle opening for storage.

While this device has proven admirably suitable for repetitive accurate measurement and precise injections, there is nonetheless one shortcoming in the use of this device, which shortcoming, among others, is manifested in the use of all such devices. It is thus necessary for the operator or user of the device to avoid immersion of the forward end of the plunger into the sampled liquid. Should this happen, or in any event to avoid the possibility of such change occurrence, the forward outside portion of the needle is usually carefully dried of the sampled liquid. In this manner, error which might result from the introduction of too much unmeasured liquid to an analytical instrument is avoided. The difficulty of this method, however, is that a high degree of care is required to eliminate this possibility of error, and too much time is lost in preparation of a specimen for injection.

It is accordingly the primary objective of the present invention to obviate these and other causes of error and, as well, to provide the art with new and novel devices for eliminating undesired surface liquid from needle or plunger surfaces, where produced by immersion of the device within the liquid specimen.

A particular object is to provide devices of such character for use in combination with prior art injection devices, as well as for use with new and novel injection devices.

A more particular object is to provide injection devices of relatively simple construction which will rapidly withdraw or pick up specimen liquids and fully discharge the precise volume of liquid for which the device is designed.

These objects and others are achieved in a combination wherein there is included, in its most simple form, a resilient or tubular plastic member through which the forward end of a reciprocable plunger, adapted for receipt of a specimen, can be extended into contact with a liquid to be sampled, and then withdrawn so that a measured liquid specimen is transmitted therethrough for storage or for injection. The external diameter of the tubular plastic member remains in wiping contact with the internal surface of the said tubular plastic member, and during the withdrawal unmeasured liquid is removed from the surface of the plunger.

Preferred liquid injection apparatus includes one which is provided with a barrel having a hollow or tubular needle mounted at the forward end thereof, a mating plunger fitted and slidable within the bore provided by the axial openings through the needle and barrel, and an enlarged opening at the forward end of the needle providing a housing through which the forward portion of the plunger can be extended or withdrawn therein for storage. In combination therewith, there is provided a resilient or tubular plastic member through the opening of which the forward end of the plunger can be extended, a liquid sample taken, and the plunger then withdrawn while in wiping contact with the opening through the tubular plastic member so that unmeasured liquid is removed therefrom.

In one form of the invention the forward end of an injection device provided with a movable plunger, used in combination with the tubular plastic member, is provided with a calibrated capillary side opening extending from the plunger face to an orifice at the side of the plunger. An injection device of this type is described in U.S. Pat. No. 3,474,674, supra. In another, a simple lateral slot, of accurately measured dimensions, is provided for containing a quantity of the liquid specimen. The wiping contact between the plastic tubular member and the surface of the plunger about the slot assures the confinement of a measured quantity of liquid within the slot. And, in yet another embodiment, the internal opening of the plastic member itself is provided with one or more longitudinal slots, this particular device being used in combination with a smooth surface plunger to provide an isolated streak of the measured liquid specimen upon the surface of the plunger. A longitudinal slot, accurately measured as to its width and depth, provided within the internal surface of the tubular plastic member, can be used in combination with a plunger. The plunger is withdrawn therethrough to leave a streak the length of which can be measured to ascertain with a high degree of accuracy and precision the volume of liquid left on the smooth surface of the plunger.

These and other features will be better understood by reference to the following detailed description and to the accompanying drawings to which reference is made in the description.

Referring to the drawings:

FIG. 1 depicts, in partial section, a typical injection device, provided with a double-end capillary opening at the forward end of a reciprocable plunger, for use with a tubular plastic member in accordance with preferred combinations of the present invention; and FIGS. 2 through 4 depict a series of fragmentary views showing, in enlarged form, the forward end of the device shown in the preceding figure, in combination with a tubular plastic member, for withdrawing a measured liquid specimen from a supply source and for removing unmeasured or excess liquid from the external surface of the plunger.

FIGS. 5 through 7 depict a similar series as described by reference to the preceding figures, except in this instance a recess, preferably a circumferential recess or groove, is used in the forward end of the reciprocable plunger to extract a measured liquid specimen; and FIGS. 8 through 11 depict a similar series as described, except in this instance a longitudinal recess or slot is provided within the tubular member itself to provide a measured streak of the liquid specimen on the surface of the plunger for storage or injection.

Figure 12:
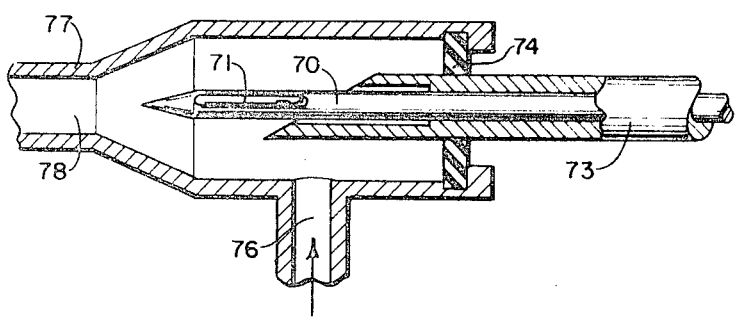

FIG. 12 shows a typical method of dispensing the measured specimen as, e.g., injecting liquid into the septum of an analytical instrument.

Referring specifically to FIG. 1 of the drawings, there is shown an injection device 10 constituted generally of a hollow member or barrel 11 having a hollow or tubular needle 12 mounted at the forward end thereof. Needle 12 is pointed at the dispensing end 121 thereof and is rigidly mounted within barrel 11 via extension through a central opening in a hub 13 and packing 14. Hub 13 and packing 14 are tightly fitted within the confines of the enclosing outer wall or shell which forms barrel 11.

A tubular guide member 15 is projected through a portion of the central opening through packing 14 from the opposite side. The opposite end of the tubular guide member 15 is secured to the rear wall 16 at the terminal end of barrel 11. The openings through guide member 15, packing 14 and needle 12 are contiguous and continuous, of generally uniform diameter, and form a passageway or bore running all the way through the central axis of the injection device 10. A slidable plunger 20 is fitted into this bore of barrel 11 from the end opposite needle 12, and the outer diameter of the plunger 20 is only slightly less than the diameter of the bore through barrel 11 so as to provide a snug fit.

The plunger 20 is enclosed by a tubular plunger guide 21, the inside diameter of which approximates or is slightly larger than the external diameter of tubular guide member 15. Plunger guide member 21 fits over, mates with and is reciprocable upon tubular guide member 15 and as such provides for the support and alignment of plunger 20 within the bore of barrel 11. Both plunger 20 and plunger guide 21 are rigidly affixed upon the handle 22 which serves as a convenient handle for application of force upon plunger 20.

The plunger guide member 21 of plunger 20 is provided with a stop 23 so that forward movement of the plunger 20 is limited by impingement of the stop 23 with a projecting shoulder or surface from barrel 11 and movement in the opposite direction is limited by contact of the stop 23 with the rear wall 16 at the end of barrel 11.

The forward end of the plunger 20 is provided with a capillary opening, and preferably a capsule or cylindrical portion 30 which can be of slightly larger external diameter than that of the plunger 20. The capsule 30 is hollow to provide a liquid sampling chamber 31 which can be totally filled in loading. In the specific embodiment shown, the forward end of plunger 20 is of tubular design, and is provided with an axial opening 29 beginning at the face of plunger 20. The opposite or terminal end of the tubular opening is side vented via opening 28 to provide a chamber 31 which is in effect a capillary bore with two open ends. The capillary opening or chamber 31 can be filled with liquid specimens and then stored by withdrawal into the dispensing end 121 of needle 12. It is thus to be observed that the forward end of needle 12 is provided with an enlarged opening 32, preferably one which is not only sufficiently large to contain the forward end of the plunger which contains the capillary opening or the capsule 30, but also large enough to contain the liquid which fills the capillary opening, even after the latter has been volatilized. The enlarged opening 32 at the dispensing end 121 of the needle 12 is thus at least twice the volume of chamber 31 of capsule 30, and can range up to 100 times its volume. Preferably the volume of opening 32 ranges from about 10 to 40 times the volume of chamber 31 of capsule 30.

Liquid is loaded into the capillary opening 31 of capsule 30 by forward movement of plunger 20 to project the capsule 30, and consequently the chamber 31, outside of needle 12, and into contact with a liquid specimen to be sampled. By touching the terminal end 29 of the chamber to a liquid to be dispensed, the chamber will fill completely. The capsule, and consequently the chamber 31, can then be withdrawn back into the dispensing end 121 of needle 12 for storage after unmeasured or excess liquid has been removed from the external surface of the plunger.

The technique of filling the calibrated chamber 31 of capsule 30, after which time excess adhering unmeasured liquid is removed from the external surface of the capsule 30, is shown by specific reference to the sequence described by FIGS. 2 through 4. The capsule 30, as shown in FIG. 2, is thus thrust through the opening 51 of a snugly fitting tubular plastic member 51 and immersed below the surface 35 of a liquid specimen for sampling, provided within a container 36. Liquid enters the orifice 29, and chamber 31 is rapidly filled up to the capillary side opening 28. Excess liquid is removed from the external surface of the capsule 30, as shown by reference to FIG. 3, by pulling or withdrawing the capsule 30 back through the snugly fitted opening 51 of tubular member 50. Excess liquid is thus wiped from the external surface of the capsule 30. After the withdrawal, as shown by reference to FIG. 4, the capsule 30 is stored within the forward opening 32 of needle 12.

The sequence of FIGS. 5 through 7 is similar to the preceding, but describes an embodiment wherein the liquid sample is loaded and contained within grooves or recesses, preferably one or more circumferential grooves or recesses, located on the forward end of a plunger. Referring to FIGS. 5 through 7, there is thus shown a plunger 40, extended from an enlarged opening 42 of a needle, containing a circumferential groove 41 of calibrated dimensions. Referring to FIG. 5, as in the preceding, the forward end of the plunger 40 is thrust through the snugly fitting opening 51 of a plastic tubular member 50 and the recessed portion 41 thereof is immersed within the liquid 35 of container 36. The plunger 40 is then withdrawn, as shown by reference to FIG. 6, until such time as the groove 41 is entirely within the opening 51 and only the pointed terminal end or tip 49 thereof is exposed. The tip 49 is dried as by wiping or by cleaning with a highly volatile solvent. All excess liquid, i.e., all liquid except that contained within the calibrated groove 41, is thus removed from the external surface of plunger 40. The forward end of plunger 40 is then withdrawn and stored within the opening 42 as shown by reference to FIG. 7.

The same principles make it quite feasible to measure out and store liquid on the forward end of a smooth plunger. This can be done by using such plunger in conjunction with a tubular plastic member containing one or more longitudinal slots.

Figure 9:
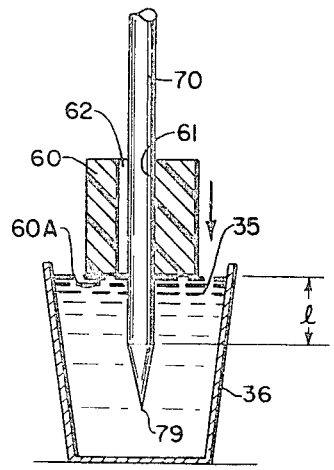
Figure 10:
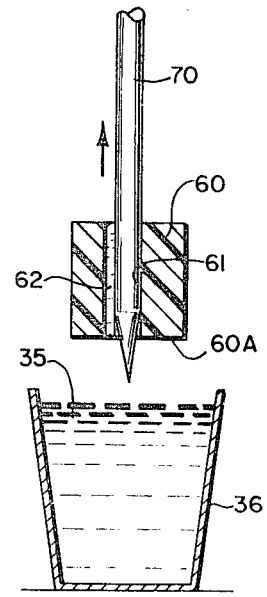
Figure 11:
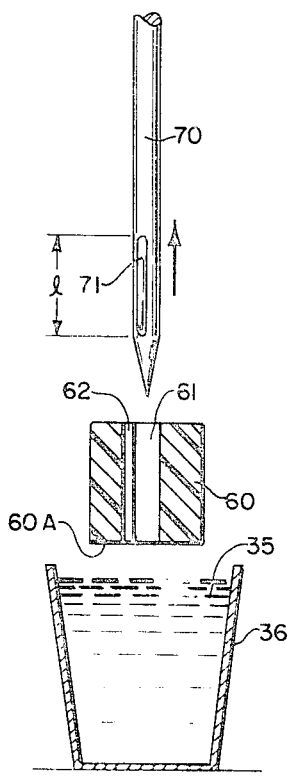

Referring to FIG. 8, there is thus shown, in cross section, an end view of a tubular plastic member 60 containing a longitudinal slot 62 of accurately measured depth and width, extending into the tubular opening 61. The use of this device in conjunction with a smooth plunger for accurately measuring and storing a liquid specimen is thus shown by reference to the sequence of FIGS. 9 through 11. Referring to FIG. 9, a smooth cylindrical plunger 70 is thrust through the snugly fitting tubular opening 61, of tubular plastic member 60, and immersed within the liquid 35 of container 36 up to the very lower face 60A of tubular member 60. The distance which the forward end of plunger 70 extends into the liquid is measured up to the location where the forward end of the plunger begins to taper to form a point 79 (if any). This is the length 1. The plunger 70, as shown by reference to FIG. 10, is then withdrawn up to the location where taper begins, and the tip 79 of the plunger 70 is cleaned and dried. The plunger 70 is then completely withdrawn for storage, as shown by reference to FIG. 11. All liquid is thus removed from the external surface of the plunger 70 except the streak 71 of known length 1. Since the width and depth of the slot 62, and the length 1 can be measured with high accuracy and precision by many known techniques, the quantity of liquid contained on the plunger surface can be easily determined.

After storage of the accurately measured liquid specimen within the forward end of a needle, as represented by any of the foregoing, it is a simple matter to inject the specimen via an injection station into, e.g., a gas chromatograph or mass spectrometer. This is shown by reference to FIG. 12. Referring to this figure, a needle 73 is thrust through septum 74 of a flared conduit opening 78 leading into a chromatograph (not shown). Carrier gas enters conduit opening 76 and enters the instrument via line 77.

The plunger 70 is then thrust forwardly to bring, e.g., the accurately measured quantity of liquid specimen 71 into or near the forward restricted portion of the flared conduit opening 78. Where the injection station is cold, the liquid is physically swept from the surface of the plunger 70, and where the liquid is sufficiently volatile, or the injection station sufficiently hot, the liquid specimen is immediately volatilized and swept by the carrier gas into the opening 78.

The barrel of the injection device can be made of substantially any material, metal alloys, steel, iron or the like. The plunger can be composed of a resilient small diameter wire, stainless steel, tungsten, chrome, platinum alloy, or the like. The packing can be made of generally conventional gasket materials, including rubber, neoprene, nylon, and the like but preferably is a self-lubricating type of packing. Polytetrafluoroethylenes, such as Teflon (Dupont Trademark for polytetrafluoroethylene) is a highly preferred material and has been found to provide excellent results.

The tubular plastic member is also constructed of generally conventional gasket materials, including natural or synthetic rubbers, e.g., chloroprene, neoprene, butadiene-styrene, and the like; and including such materials as nylon, dacron, various poly esters, polyvinyl chloride and the like; but preferably a self-lubricating type of plastic is used. The polyfluoroethylenes, e.g., polytetrafluoroethylene (Teflon), are highly preferred materials. They are, in fact, outstanding for such usage.

It is apparent that various modifications and changes can be made in, e.g., the precise construction materials, size, shape and relative dimensions, without departing the spirit and scope of the invention. It is also feasible, e.g., to change the size and shape as well as the number of the recesses, slots or grooves located in the forward end of the plunger, or in the tubular member itself which is used in conjunction therewith.

Having described in the invention, what is claimed is:

1. Apparatus for receipt and injection of a liquid specimen in quantities as small as $10^{-2}$ to $10^{-6}$ milliliters with high accuracy and precision comprising the combination of a resilient tubular member and a reciprocable plunger, the forward end of which is adapted for receipt of a liquid specimen, which can be extended through the tubular opening of the said resilient tubular member into contact with the liquid to be sampled for receipt of a measured amount of the liquid specimen, and then withdrawn so that unmeasured liquid is wiped from the external surface of the forward end of the plunger.

2. The apparatus of claim 1 wherein the forward end of the plunger is recessed for receipt of the measured liquid specimen, and the tubular opening within the resilient tubular member is in wiping contact with the external surface of forward end of the plunger for removing unmeasured liquid.

3. The apparatus of claim 1 wherein the internal portion of the opening within the tubular member is provided with a longitudinal slot of measured width and depth for providing a measurable streak of the liquid specimen on the forward end of a plunger of smooth external surface.

4. The apparatus of claim 3 wherein the tubular member is constructed of plastic.

5. The apparatus of claim 4 wherein the plastic is Teflon.

6. The apparatus of claim 1 wherein the forward end of the reciprocable plunger is enlarged and contains therein a double-end capillary opening, one end of the opening extending from an orifice at the face of the plunger while the other end opens through an orifice in the side of the plunger.

7. The apparatus of claim 1 wherein the forward end of the reciprocable plunger is provided with a circumferential groove for containing the measured liquid specimen.

8. The apparatus of claim 1 wherein the reciprocable plunger is mounted within an axial opening within a tubular needle, mounted on the forward end of a barrel.

9. The apparatus of claim 8 wherein the internal forward end of the needle is enlarged, and therein can be stored the liquid specimen-containing forward end of the plunger.

10. The apparatus of claim 9 wherein the enlarged forward opening of the needle ranges from about twice up to about 100 times the volume of liquid specimen which can be contained at the forward end of the plunger.

* * * * *